United States Patent
Phillips

(10) Patent No.: US 6,353,975 B1
(45) Date of Patent: Mar. 12, 2002

(54) HOSE HOLDING STRAP

(75) Inventor: Charles A. Phillips, Riverton, UT (US)

(73) Assignee: Bridgewater, Inc., Riverton, UT (US)

( * ) Notice: Subject to any disclaimer, the term of this patent is extended or adjusted under 35 U.S.C. 154(b) by 0 days.

(21) Appl. No.: 09/435,503

(22) Filed: Nov. 6, 1999

(51) Int. Cl.⁷ ......................... A44B 18/00; A44B 21/00; B65D 63/00
(52) U.S. Cl. ......................... 24/16 R; 24/3.13; 24/17 B; 24/442
(58) Field of Search ................. 24/16 R, 17 R, 24/17 B, 3.13, 442

(56) References Cited

U.S. PATENT DOCUMENTS

| | | | |
|---|---|---|---|
| 3,835,505 A | * 9/1974 | Shewbridge | 24/16 R |
| 3,947,927 A | * 4/1976 | Rosenthal | 24/16 R |
| 3,981,048 A | 9/1976 | Moody et al. | 24/16 PB |
| 3,994,048 A | * 11/1976 | Rosenthal | 24/16 R |
| 4,112,521 A | * 9/1978 | Uke | 24/442 |
| 4,114,838 A | * 9/1978 | Knauf | 24/16 R |
| 4,149,540 A | * 4/1979 | Hasslinger | 24/16 R |
| 4,379,359 A | 4/1983 | Young | 24/273 |
| 4,411,049 A | 10/1983 | Cristea | 24/20 EE |
| 4,675,949 A | 6/1987 | DaCosta | 24/269 |
| 4,903,922 A | 2/1990 | Harris, III | 248/75 |
| 5,005,790 A | 4/1991 | Harris, III | 248/75 |
| 5,083,346 A | 1/1992 | Orton | 24/16 PB |
| 5,136,759 A | * 8/1992 | Armour, II | 24/442 |
| 5,167,050 A | 12/1992 | Korsen | 24/16 R |
| 5,348,362 A | 9/1994 | Rolls | 294/151 |
| 5,439,265 A | 8/1995 | Plante | 294/152 |
| 5,460,308 A | 10/1995 | Hahn | 224/257 |
| 5,542,730 A | 8/1996 | Riesselmann | 294/157 |
| 5,579,966 A | 12/1996 | Krumweide et al. | 224/637 |
| 5,709,424 A | 1/1998 | Schuler | 294/148 |
| 5,769,290 A | * 6/1998 | Pestana | 224/178 |
| 5,881,436 A | * 3/1999 | Lyons | 24/16 R |

\* cited by examiner

Primary Examiner—Victor N. Sakran
(74) Attorney, Agent, or Firm—Lloyd W. Sadler

(57) ABSTRACT

A conduit stress relief strap, which provides improved weight and tension relief along with being an adjustable, flexible, easy to attach and detach strap. This invention is particularly adapted to provide relief to hoses, cables, and other like flexible conduit. The combination of hook and loop fasteners and strap loop devices provides greatly improved flexibility and adjustment while maintaining stress relief at the point of connection between two conduits.

9 Claims, 3 Drawing Sheets

HOSE HOLDING STRAP

BACKGROUND OF THE INVENTION

1. Field of the Invention

This invention relates to devices for holding or supporting hoses, cables and other connectable conduit apparatuses. More specifically, this invention relates to flexible straps, which support the weight or reduce the tension on hoses, cables and other like devices.

2. Description of Related Art.

A variety of clamps, ties and carrying devices adapted to hold cables and the like have been proposed. Traditionally, these devices provide only part of the support solution. For example, they are often designed to work with only certain conduits, or they are often not reusable, or they are mechanically complex, or they provide only inadequate adjustments. Because of the particular tensions and stresses which are placed on connectable hoses, cables and the like as they are being laid from a source through obstacles to a destination, and the likelihood that such conduits will become disconnected, a general purpose support solution which holds connected ends of the conduit together is highly desired. For general background material, the reader is directed to the following U.S. Patent documents, each of which is hereby incorporated by reference in its entirety for the material contained therein.

U.S. Pat. No. 3,981,048 describes a clamp for holding a pair of elongate objects such as hoses in a spaced, generally parallel relationship.

U.S. Pat. No. 4,379,359 describes a toggle clamp assembly for a flexible hose that includes a flexible strap having a friction grip buckle for securing the ends of the strap into a loop around a hose and a toggle lever having one end attached to the strap and adapted to pivot from a non-tensioning position to a tensioning position.

U.S. Pat. No. 4,411,049 describes a retainer strap for use in holding together and/or supporting wires, hoses, ropes or the like.

U.S. Pat. No. 4,675,949 describes a clamp for a hose that comprises a drum, which is confined for rotation within a clip.

U.S. Pat. Nos. 4,903,922 and 5,005,790 describe a hose holding fixture for supporting all or part of a water or garden hose connected to a faucet.

U.S. Pat. No. 5,083,346 describes a fastening assembly for elongate articles that comprises an annular member and a nondeformable flexible strap, the strap being adapted for passage through the channel of the annular member so that the articles are received upon and resiliently opposed by, seating members provided along each marginal edge of the annular member.

U.S. Pat. No. 5,167,050 describes a device for bundling objects such as cords, cables, wire, and hose that comprises an elongated flexible strap having one side hook-loop material and having on the opposing side, for engagement therewith, complementary hook-loop material, having on one end of the strap a clasp for looping the strap therethrough to encircle an object for fastening the device thereto; having a rigid threading member on an opposing end of the strap for convenient threading of the strap through the clasp.

U.S. Pat. No. 5,348,362 describes a carrier for supporting a coil formed from a length or wire or hose that comprises an arcuately shaped supported member defining a top support surface and a bottom support surface; a plurality of fasteners secured to a top surface at ends of the support member for holding the coil to the bottom surface of the support member, the fastener includes a flexible strap looped under the coil.

U.S. Pat. No. 5,439,265 describes a sling for positioning a large-diameter hose (such as a fire hose) while the hose is under pressure.

U.S. Pat. No. 5,460,308 describes a carrying strap for toting articles of clothing, including a first end for forming a shoulder strap, and a second end for forming a toting strap for carrying the article U.S. Pat. No. 5,542,730 describes an improved fire hose carrier which provides greater ease in handling and moving hose, particularly when under pressure, and which is readily attachable and detachable to and from a fire hose.

U.S. Pat. No. 5,579,966 describes an apparatus for carrying folded hose, such as fire hose to locations where it is needed. The apparatus is constructed of lightweight, flexible material, such as webbed nylon and is capable of being worn on the back of a person, as a backpack.

U.S. Pat. No. 5,709,424 describes an apparatus for elastically gripping and holding an article, that comprises a flexible elongated handle member lying generally along a longitudinal handle axis, the handle defining an interior carrying opening proximate one end, and including a strap coupling area spaced from the carrying opening; a flexible, elastic strap coupled to the handle member at the strap coupling area and extending therefrom.

SUMMARY OF THE INVENTION

It is desirable to provide a conduit supporting strap that provides weight and connection support to hoses, cables and the like, which is particularly adapted to relieving tension and stress at the linear connection between two flexible conduits.

Therefore, it is the general object of this invention to provide a strap that can be attached near the ends of two conduits, which are attached end to end, to provide tension reduction and thereby avoid disconnection of the conduits.

A further object of this invention is to provide a strap device that is flexible, so as to avoid inducing additional mechanical stress to the conduits.

Another object of this invention is to provide a strap device that adjustable to hold a wide range of different conduits, including but not limited to large and small diameter hoses and electrical cables.

It is a further object of this invention to provide a strap device that is adjustable in its positioning relative to the connection between the conduits.

It is another object of this invention to provide a strap, which is easily attachable and removable without special tools.

A still further object of this invention is to provide a strap that is mechanically simple, low cost and reliable.

These and other objects of this invention are achieved by the apparatus described herein and will be readily apparent to those of ordinary skill in the art upon a review of the following drawings, detailed description and claims.

DETAILED DESCRIPTION OF THE INVENTION

This invention is a strap device for providing weight and stress relief for a wide range of connectable conduits, including, but not limited to, hoses, cables and electrical conductors. In its preferred embodiment, two portions are each provided with hook and loop material sections, such as "Velcro," along with one or more strap loops to provide the fastening required for holding the connected conduits together, while providing easy adjustment and the flexibility required for use with flexible conduit.

Figure 1:
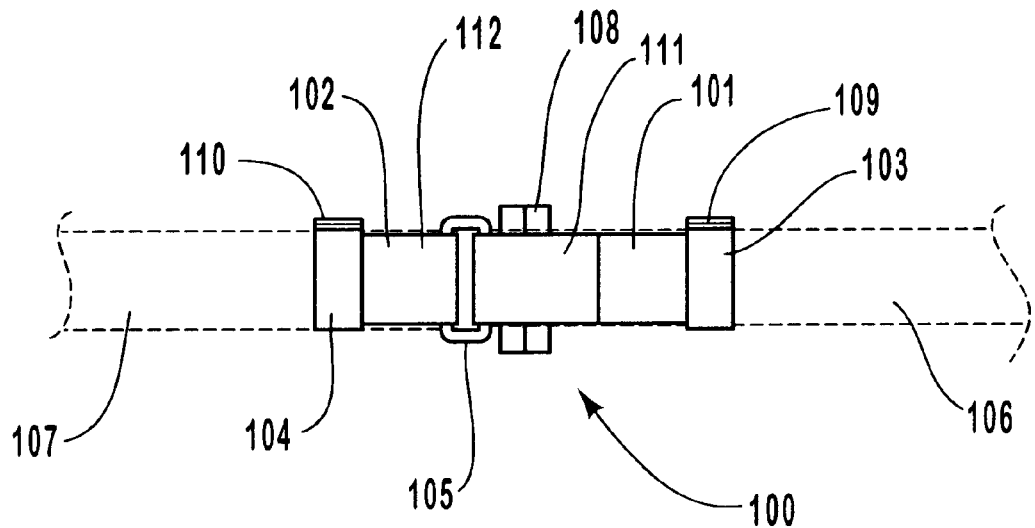
FIG. 1 is an illustration of the first side view of the preferred strap of this invention fixed around two connected conduits.

FIG. 1 shows an illustration of the first side view of the preferred strap of this invention 100 fixed around two connected conduits 106, 107. The first conduit 106 is connected to the second conduit 107 by a connector 108. The first portion 101 of the strap 100 is provided with a conduit holding segment 103, which in this view is wrapped around the first conduit 106 with an overlap 109 that is partially held in place by a strap loop 304, and a segment 111 for attaching to the second portion 102. Typically and preferably, the segment 111 is positioned over the conduit connector 108 when the strap 100 of this invention is in position on the conduits 106, 107. The second portion 102 is provided with a conduit holding segment 104, which is this view is wrapped around the second conduit 107 with an overlap 110 that is partially held in place by a strap loop 406, and a segment 112 with a strap loop 105 for attaching to the segment 111 of the first portion 101. In the preferred embodiment of this invention, the strap loops, 105, 304, and 406 are made of ABS plastic, although alternative materials, such as metal, cloth and the like can substituted without departing from the concept of this invention. The preferred material for the strap is a synthetic nylon material, although alternative flexible materials can be substituted without departing from the concept of this invention.

Figure 2:
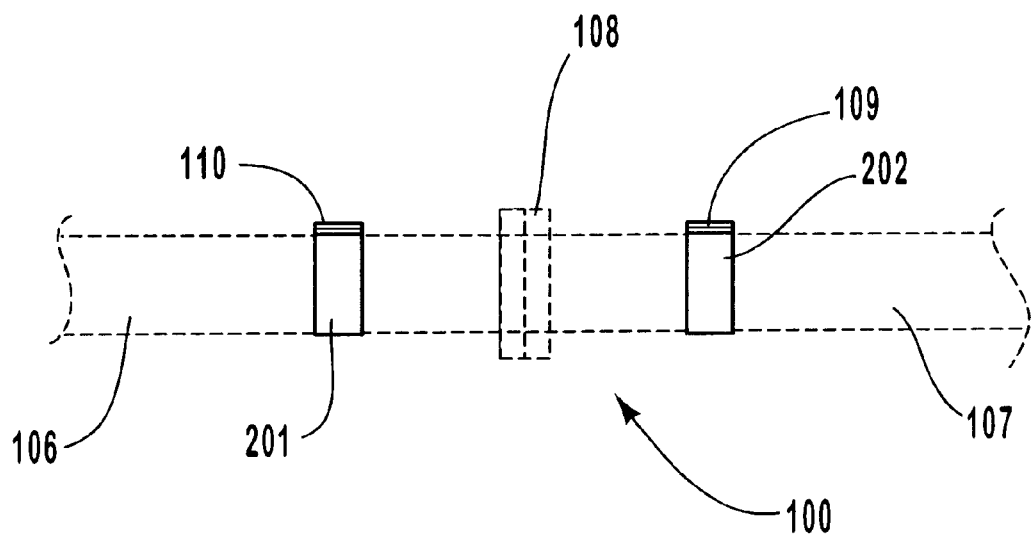
FIG. 2 is an illustration of the second side view of the preferred strap of this invention fixed around two connected conduits.

FIG. 2 shows the second side view of the preferred strap 100 of this invention fixed around two connected conduits 106, 107. This view more clearly shows the other side 201, 202 of the conduit holding segments 103, 104 as they are wrapped around the conduits 106, 107.

Figure 3A:
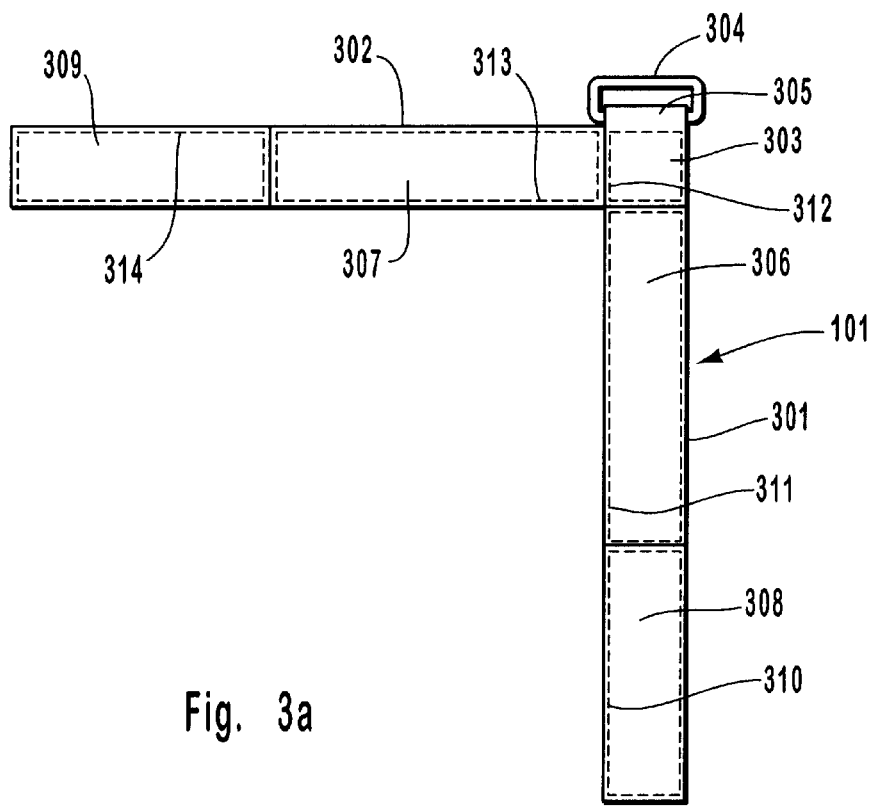
FIGS. 3a and 3b are views of the first and second sides of the preferred embodiment of the first portion of the preferred embodiment of this invention.

FIG. 3a shows a detailed view of the first side of the first portion 101 of the preferred embodiment of this invention 100. This view shows the first segment 301 and the second segment 302 joined at an overlap region 303. Preferably, the first 301 and second 302 segments are held together at the overlap region 303 by stitching 312. When wrapped around a conduit 106, the first segment 301 becomes the cable holding segment 103. The strap loop 304 is fixed to the first segment 301 by wrapping the end 305 of the first segment 301 through the strap loop 304 and stitching it in place on the opposite side of the overlap region 303. The first segment 301 has a hook surface 308 stitched 310 to this first side of the first portion 101. Also stitched 311 to the first segment 301 is a loop surface 306. When wrapped around the conduit 106 the hook surface 308 is fixed to the loop surface 306, thereby fixing the conduit holding segment 103 in place. A second segment 302 of the first portion 101 is provided with a hook surface 309 stitched 314 to its 302 first side. Also stitched 313 to the second segment 302 of the first portion 101 is a loop surface 307. The second segment 302 is the attachment segment 111 when it is fixed to the second portion 102 through the strap loop 105. Again, the second segment's 302 hook 309 and loop 307 surfaces serve to lock the first portion 101 in place relative to the second portion 102.

Figure 3B:
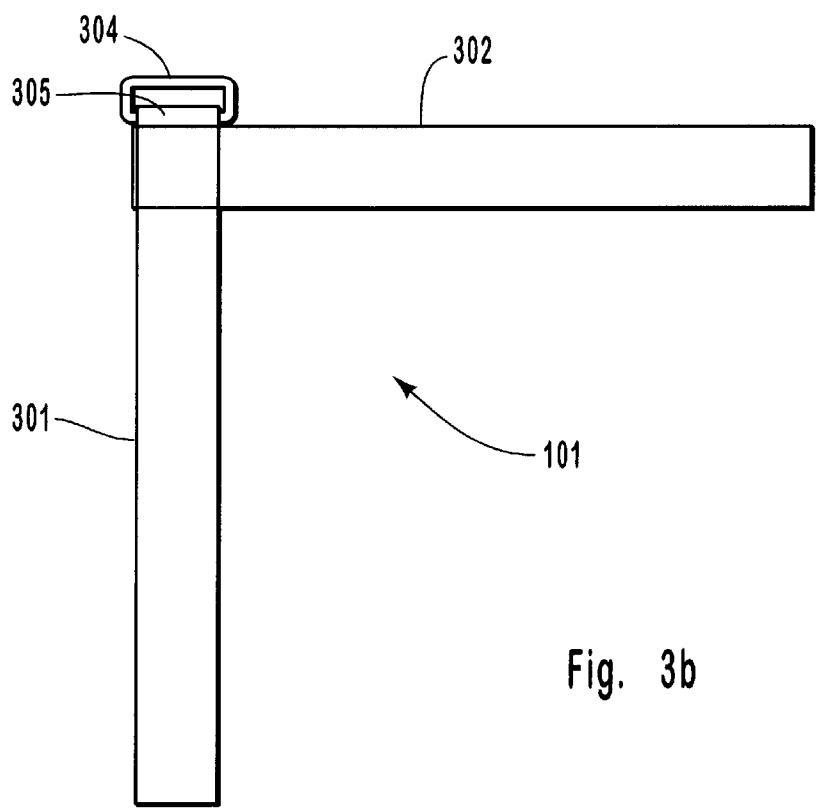

FIG. 3b shows a detailed view of the second side of the first portion 101 of the preferred embodiment of this invention 100. The first segment 301 is shown attached to the second segment 302, with the strap loop 304 shown having the end 305 of the first segment 301 looping through the strap loop 304.

Figure 4A:
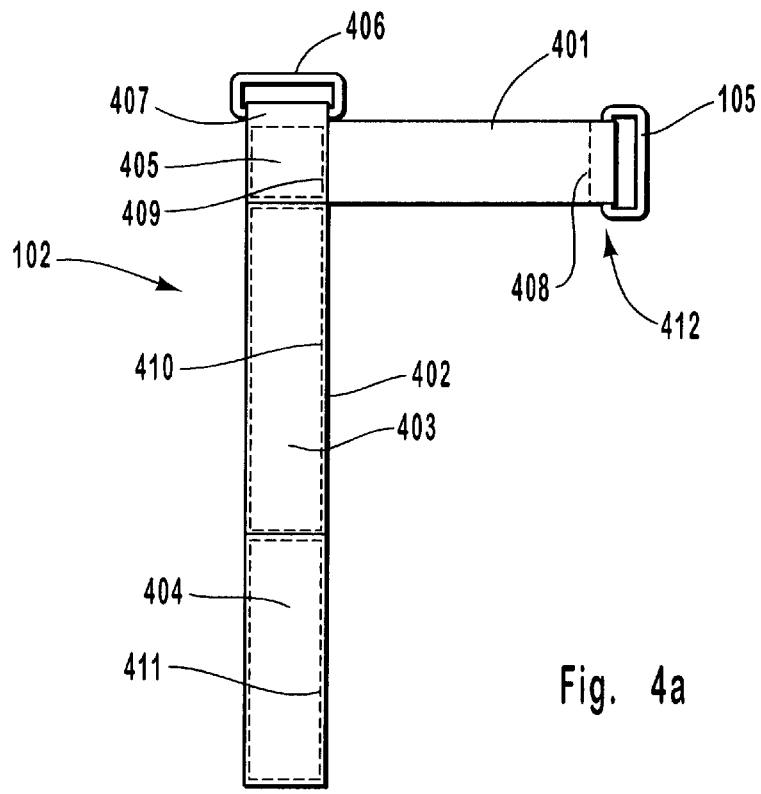
FIGS. 4a and 4b are views of the first and second sides of the preferred embodiment of the second portion of the preferred embodiment of this invention.

FIG. 4a shows the first side of the preferred embodiment of the second portion 102 of the preferred embodiment of the invention 100. This view shows the first segment 401 and the second segment 402 joined at an overlap region 405. Preferably, the first 401 and second segment 402 are held together by stitching 409. When wrapped around the conduit 107, the second segment 402 becomes the cable holding segment 104. The strap loop 406 is fixed to the second segment by wrapping the end 407 of the second segment 402 through the strap loop 406 and stitching it in place on the opposite side of the overlap region 405. The second segment 402 has a hook surface 404 stitched 411 to the first side of the second portion 102. A loop surface 403 is also stitched 410 to the first side of the second portion 102. When wrapped around the conduit 107 the hook surface 404 is fixed to the loop surface 403, thereby fixing the conduit holding segment 104 in place. The first segment 401 of the second portion 102 is provided with the strap loop 105 fixed to its 102 unattached end 412.

Figure 4B:
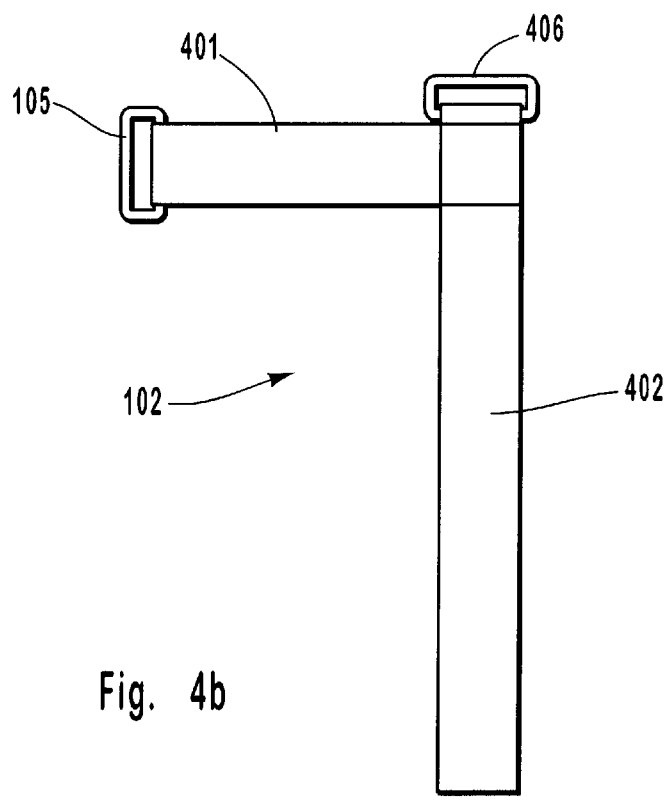

FIG. 4b shows the second side of the preferred embodiment of the second portion 102 of the preferred embodiment of the invention 100. The first segment 401 of the second portion 102 is shown attached to the second segment 402, with the strap loops 105 and 406 shown appropriately attached to the first segment 401 and second segment 402 respectively.

The described embodiment is to be considered in all respects as illustrative only and not as restrictive. Although the preferred embodiment described here includes specific segments and materials, this invention is not limited thereto. The number of segments can be increased as necessary to hold the particular conduit. Also, while stitching is the preferred means of fixing the segments together, alternatives such as bonding, stapling, clipping and the like can be substituted without departing from the concept of this invention. In sum, the scope of this invention is indicated by the appended claims rather than by the foregoing description. All changes, which come within the meaning and range of equivalency of the claims, are to be embraced as being within their scope.

I claim:

1. A conduit holding strap, comprising:
    (A) a first portion, having a first segment, a second segment and a first strap loop, and wherein said first segment is fixed to said second segment at an angle of generally ninety degrees; and
    (B) a second portion, having a first segment, a second segment and a second strap loop.

2. A conduit holding strap, as recited in claim 1, further comprising a third strap loop fixed to said first segment of said second portion.

3. A conduit holding strap, as recited in claim 2, wherein said first portion is attached to said second portion by inserting said second segment of said first portion in said third strap loop of said second portion.

4. A conduit holding strap, as recited in claim 1, wherein said first segment of said first portion further comprises a surface and a hook surface fixed to said surface of said first segment.

5. A conduit holding strap, as recited in claim 4, wherein said first segment of said first portion further comprises a loop surface fixed to said surface of said first segment.

6. A conduit holding strap, as recited in claim 1, wherein said second segment of said first portion further comprises a surface and a hook surface fixed to said surface of said second segment.

7. A conduit holding strap, as recited in claim 6, wherein said second segment of said first portion further comprises a loop surface fixed to said surface of said second segment.

8. A conduit holding strap, as recited in claim 1, wherein said second segment of said second portion further comprises a surface and a hook surface fixed to said surface of said second segment.

9. A conduit holding strap, as recited in claim 8, wherein said second segment of said second portion further comprises a loop surface fixed to said surface of said second surface.

* * * * *